United States Patent [19]
Hashimoto

[11] 3,944,340
[45] Mar. 16, 1976

[54] LENS BARREL FOR A CAMERA
[75] Inventor: Shigeru Hashimoto, Yokohama, Japan
[73] Assignee: Canon Kabushiki Kaisha, Tokyo, Japan
[22] Filed: Nov. 26, 1974
[21] Appl. No.: 527,207

[30] Foreign Application Priority Data
Nov. 30, 1973 Japan............................ 48-135598

[52] U.S. Cl................................. 350/255; 350/187
[51] Int. Cl.² ......................................... G02B 7/02
[58] Field of Search .......... 350/184, 186, 187, 252, 350/255, 257; 354/195, 197

[56] References Cited
UNITED STATES PATENTS
2,873,646  2/1959  Angenieux ........................ 350/187

Primary Examiner—John K. Corbin
Assistant Examiner—F. L. Evans
Attorney, Agent, or Firm—Toren, McGeady and Stanger

[57] ABSTRACT

The present invention relates to a lens barrel so constructed that the lens barrel presents a lens frame movable along the optical axis by the operation member by means of the engagement of a pin in a cam groove, whereby in order to prevent from the damage of the cam groove a cylindrical member with a protection member projecting beyond the front of the movable lens frame is provided in such a manner that the force given from outside is received by the fixed barrel through the protection member.

5 Claims, 3 Drawing Figures

LENS BARREL FOR A CAMERA

DESCRIPTION OF THE INVENTION

The present invention relates to a lens barrel. A lens barrel which is so designed that the rotation of the operation ring is transferred to the movable lens frame by means of the engagement of a pin with a cam groove so as to move the lens along the direction of the optical axis is widely utilized in the mechanism for varying the focal distance of a zoom lens or for focussing of an ordinary lens, whereby the movable lens frame at the front or the accessaries such as filters or the like mounted on the frame are projecting out of such a lens barrel so that there exists a possibility that the operation might become impossible because the cam groove or the pin is damaged when they are struck against other hard things during transportation or photographing.

Even if on the other side the operation is possible there exists a possibility that the optical efficiency might be remarkably reduced when much play takes place between the cam groove and the shaft.

The purpose of the present invention is to eliminate such shortcomings as mentioned above, by prolonging the mantle of the lens barrel beyond the most advanced position of the movable lens so as to form a protection part in such a manner that the cam groove, the pins or the like can be protected whereby the accessaries such as filters or the like can easily be mounted.

Below the present invention will be explained according to the drawings of the embodiments of the present invention.

Figure 1:
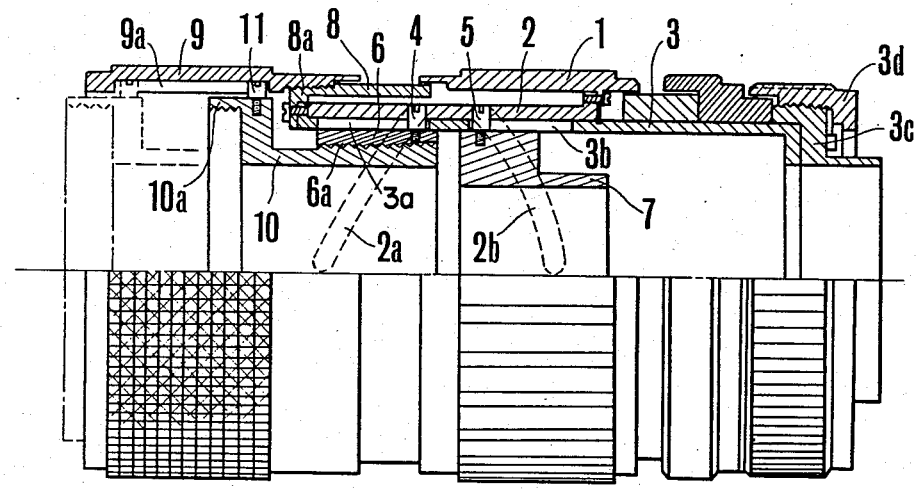
FIG. 1 shows a side view of a conventional lens barrel, whereby a part is cut open.

In FIG. 1, 1 is the zoom ring while 2 is the cam cylinder being combined with the ring as one body and presenting the cam grooves 2a and 2b. 3 is a fixed guide cylinder presenting at the back the mount part 3c and the bayonet ring 3d for mounting the cylinder on a cam and on the circumference the linear grooves 3a and 3b. 4 and 5 are respectively pins being provided on the movable cylinders 6 and 7 and in engagement in the above mentioned linear grooves 3a, 3b, and the above mentioned cam grooves 2a, 2b of the cam cylinder.

The movable cylinder 6 holds a lens frame 10 on its internal surface by means of a helicoidal screw 6a, while the pin 11 provided on the lens frame is engaged in the linear groove 9a provided on the internal surface of the distance ring 9. The distance ring 9 is engaged with the cylinder 8 fixed on the guide cylinder 3 by means of a screw 8a.

With the rotation of the zoom ring 1, the cam cylinder 2 rotates as one body whereby by means of the engagement of the pins 4 and 5 in the cam grooves 2a and 2b the movable cylinder 6 and 7 are moved forwards and backwards in such a manner that the distance between the front lens group and the rear lens group (not shown in the drawing) held in the lens frame 10 and the movable cylinder 7 is varied so that the focal distance of the optics can be adjusted. Hereby the frame 10 for the front lens group is advanced and retired linearly with the movable cylinder 6 while the pin 11 is moved inside the linear group 9a so that the helicoidal screw 6a makes no effect. Then with the rotation of the distance ring 9 the frame 10 for the front lens group is rotated by means of the pin 11 and advanced and retired by the effect of the helicoidal screw 6a.

When the lens frame 10 is advanced up to the nearest position, the screw part 10a for mounting accessaries at the front projects out of the front of the distance ring.

Figure 2:
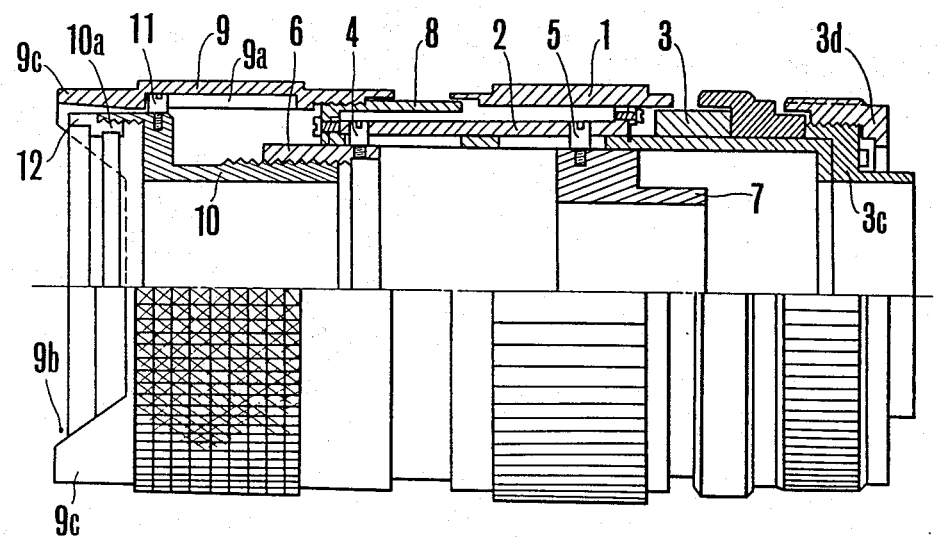
FIG. 2 shows a side view of an embodiment of the present invention, whereby a part is cut open.

FIG. 2 shows an embodiment in which the front of the distance ring is prolonged further ahead in such a manner that the part movable forwards and backwards by means of the engagement of the pin in the groove and advanced up to the furthest position might be protected by the mantle member.

In FIG. 2, 12 is a filter frame being mounted at the front of the frame 10 for the front lens group by means of a screw 10a whereby the front of the distance ring 9 forms a protection member 9c for protecting the lens frame, projecting beyond the front of the filter frame 12 when the lens grame 10 is advanced utmost. The distance ring 9 is rotatably engaged with the fixed ring 8 by means of screw 8a like to the lens barrel shown in FIG. 1 so that the force given to the front from outside is received by the whole surface of a number of threads of the screw 8a and therefore such a deformation as disturbs operation does not take place in such a manner that the lens frame can be protected from any force or shocks given from outside. Further, on the circumference of the front of the distance ring 9 two or three notches 9b are provided in such a manner that the filter frame or the like can be screwed in the front of the lens frame whereby the protection part is not touched by hand.

The distance ring 9 in the drawing is of one body construction, whereby it goes without saying that the ring can be assembled with two or three parts for the sake of the easy working of the linear groove.

Figure 3:
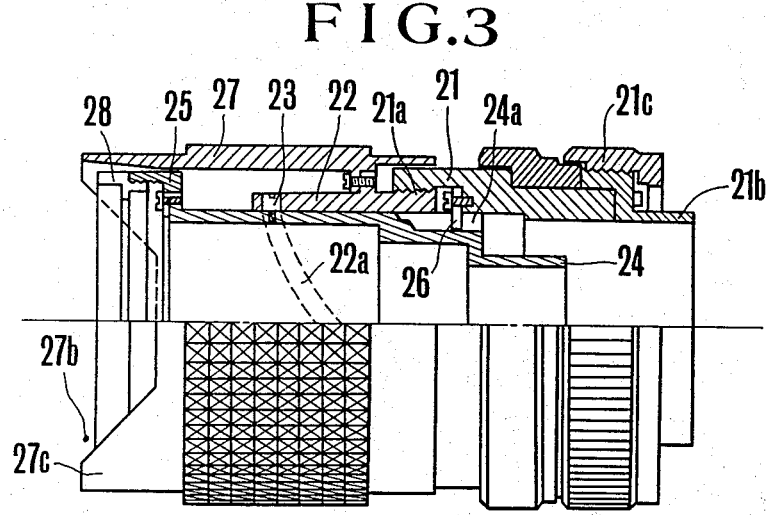
FIG. 3 shows a side view of another embodiment of the present invention, whereby a part is cut open.

FIG. 3 shows an embodiment of the lens barrel in which the focus adjustment can be made by means of the cam groove and the pin, whereby 21 is a fixed barrel presenting at the back a mount part 21b and a bayonet 21c and on the internal surface a screw 21a for holding the cam cylinder 22.

On the internal surface of the above mentioned cam cylinder a lens frame 24 for holding an optics not shown in the drawing is adapted, while the pin 23 provided on its circumference is engaged in the cam groove 22a of the cam cylinder. The cam cylinder is connected with the distance ring 27 into one body, and at the back of the lens frame 24 a groove 24a for straight movement is provided in which groove a key 26 fixed on the fixed barrel 21 engages.

With the rotation of the distance ring 27 the cam cylinder 22 rotates as one body in such a manner that the lens frame 24 is advanced and retired linearly by means of the pin 23 so as to adjust the focussing.

When the focus is adjusted at the nearest position the lens frame 24 is most advanced, whereby because the front 27c of the distance ring 27 forms a protection part which covers the front of the filter frame mounted on the mount part 25 at the front of the lens frame 24 there exists no danger for damaging the pin on the lens frame or the cam cylinder likely to the embodiment shown in FIG. 2 even when a force is given from outside. Likely to the embodiment shown in FIG. 2 a notch 27b for facilitating the mounting of the filter is provided at the front of the distance ring 27 so that the operation for mounting the filter can be carried out easily.

In the shown embodiment the pin is provided on the movable lens frame while the cam groove is provided on a ring making one body with the operation ring, whereby it goes without saying that a cam groove can be provided on the movable lens frame while the pin can be provided on the operation ring. Further the cam groove can be provided on the fixed barrel while the pin can be provided on the movable lens frame.

The present invention relates to a lens barrel so constructed that the lens frame in the lens barrel is moved by means of the cam groove and the pin, which is characterized in that the mantle part of the lens barrel projects beyond the movable lens frame or the accessaries mounted on the movable lens frame so as to form a protecting part and that next to the protecting part a notch for facilitating the mounting operation of the accessaries in such a manner that a lens barrel on which accessaries can easily be mounted can be obtained according to the present invention whereby the pin, the cam groove and the like of the lens moving mechanism is protected from the force from outside.

What is claimed is:

1. A lens barrel for the lens system of a camera, said lens system including an optical axis and a front end, said lens barrel comprising a fixed barrel for mounting upon said camera, a lens frame having a lens mounted thereon disposed at said front end of said lens system and being movable within said fixed barrel in the direction of said optical axis, an operation means capable of revolving about said fixed barrel to effect displacement of said lens frame, a cam groove and a pin engaged within said cam groove, said pin and cam groove operatively interposed between said operation means and said movable lens frame to effect movement of said lens frame when said operation means is revolved about said fixed barrel, a cylindrical member, and an engaging portion, said cylindrical member being rotatably engaged upon the circumference of said fixed barrel by said engaging portion, said cylindrical member being configured to form a mantle member of said lens barrel, said lens barrel being configured with said cylindrical member always protruding beyond said movable lens frame at said front end of said lens system so as to protect said lens frame in such a manner that a force exerted on said cylindrical member from exteriorly thereof is received by said fixed barrel through said engaging portion.

2. A lens barrel according to claim 1 wherein said lens frame includes a member for mounting accessories at said front end and wherein said cylindrical member includes a protection member at the front end thereof projecting beyond the front of accessories mounted upon said lens frame.

3. A lens barrel according to claim 1 wherein a portion of said cylindrical member protruding beyond said movable lens frame includes a notch formed therein.

4. A lens barrel according to claim 1 wherein said cylindrical member is a focus adjusting ring.

5. A lens barrel for the lens system of a camera, said lens system including an optical axis, said lens barrel comprising a fixed barrel for mounting upon said camera, a first and a second movable lens frame each having a lens mounted therein, both said first and second lens frames being mounted for displacement within said fixed barrel in the direction of said optical axis, a rotatable operation means for displacing said first movable lens frame to effect zooming operation, a cam groove and a pin engaged within said cam groove, said cam groove and said pin being arranged to operatively interconnect said operation means and said first lens frame, a distance being rotatably mounted upon the periphery of said fixed barrel to displace said first movable lens frame in order to effect focussing operation, said distance ring being adapted to form an outer casing member of said lens barrel and including a nose portion configured to protrude at all times during operation of said lens barrel beyond said first movable lens so as to protect said movable lens frame.

* * * * *